United States Patent [19]
Stephen

[11] 3,890,380
[45] June 17, 1975

[54] PROCESS FOR INCREASING THE BULK DENSITY OF SALTS OF 2-(3-PHENOXYPHENYL)PROPIONIC ACID

[75] Inventor: Erwin A. Stephen, Indianapolis, Ind.

[73] Assignee: Eli Lilly and Company, Indianapolis, Ind.

[22] Filed: June 19, 1974

[21] Appl. No.: 480,783

[52] U.S. Cl. .............................................. 260/520
[51] Int. Cl. ...................... C07c 65/00; C07c 51/42
[58] Field of Search ..... 260/520, 707, 534 E, 475 P

[56] References Cited
UNITED STATES PATENTS

| | | | |
|---|---|---|---|
| 3,600,437 | 8/1971 | Marshall | 260/473 R |
| 3,714,268 | 1/1973 | Kaminaka et al. | 260/624 R |

OTHER PUBLICATIONS
Ikehi, Chem. Abst. 79, 18350C (1973).
Ashida et al., Chem. Abst. 1835H (1973).

*Primary Examiner*—John F. Terapane
*Attorney, Agent, or Firm*—William C. Martens, Jr.; Everet F. Smith

[57] ABSTRACT

The bulk density of the dehydrate sodium or calcium salt of 2-(3-phenoxyphenyl)propionic acid, when less than 0.60 grams per milliliter, and, preferably, less than 0.45 grams per milliliter, is increased to at least 0.65 grams per milliliter by dehydrating the low bulk density material to a water content less than that represented by a monohydrate form, rehydrating the dehyrated material by contacting it with water maintained at a temperature of from about 60°C. to about 90°C., and recovering the dehydrate salt of increased bulk density.

7 Claims, No Drawings

PROCESS FOR INCREASING THE BULK DENSITY OF SALTS OF 2-(3-PHENOXYPHENYL)PROPIONIC ACID

BACKGROUND OF THE INVENTION 2-(3-phenoxyphenyl)propionic acid and pharmaceutically acceptable cationic salts thereof are recognized as compounds which have excellent anti-inflammatory activity and which exhibit aspirin-like analgesic and anti-pyretic activity. These compounds are claimed in U.S. Pat. No. 3,600,437. It has been discovered that in the preparation of these compounds a product generally is obtained which has a low bulk density, usually of the order of from about 0.25 to about 0.45 g. per ml. A product of such low bulk density tends to exhibit undesirable properties such as poor flowability and static charge, all of which leads to handling difficulties. Additionally, low bulk density gives rise to serious problems in drug packaging since, bulk density being inversely proportional to volume, a substantial increase in volume is required for a given dosage unit when the bulk density is low.

These problems have been avoided by the discovery which forms the basis of this invention. This invention is directed to a process for increasing the bulk density of a pharmaceutically acceptable cationic salt of 2-(3-phenoxyphenyl)propionic acid. The process of this invention, since it increases the bulk density, correspondingly improves flowability and diminishes any tendency of the product to exhibit a static charge, thereby additionally improving its suitability for drug packaging in the form, for example, of capsules, tablets, and the like.

SUMMARY OF THE INVENTION,

This invention is directed broadly to a process for increasing the bulk density of a dihydrate salt compound of the formula

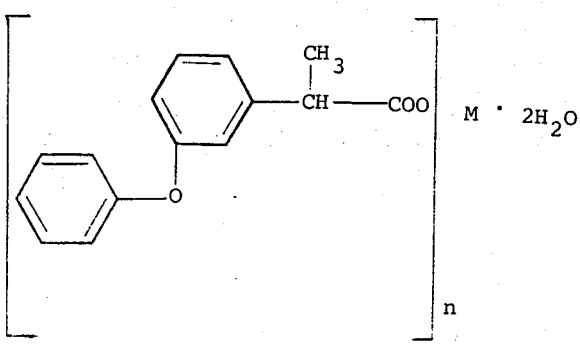

in which M is sodium or calcium, and, when M is sodium, $n$ is 1, and, when M is calcium, $n$ is 2, said compound having a bulk density of less than 0.60 grams per milliliter, which comprises reducing the water content of said compound to less than that represented by a monohydrate form, hydrating the compound of reduced water content by contacting said compound with water maintained at a temperature of from about 60°C. to about 90°C. and separating the resulting dihydrate salt compound having a bulk density of at least 0.65 grams per milliliter.

DETAILED DESCRIPTION OF THE INVENTION

In accordance with this invention there is hereby provided a method for increasing the bulk density of the sodium of calcium salt of 2-(3-phenoxyphenyl)propionic acid. It will be recognized, since calcium forms a divalent cation, that two moieties of the acid are present for each calcium ion. Additionally, under normal circumstances, the calcium salt exists in the form of its dihydrate, and, thus, unless special conditions are employed, two molecules of water are present per each molecule of the calcium salt.

The sodium salt of 2-(3-phenoxyphenyl)propionic acid likewise exists in the form of its dihydrate. Since sodium forms a monovalent cation, only one moiety of the acid is present for each sodium ion. The sodium salt can be prepared in accordance with the procedure provided in U.S. Pat. No. 3,600,437. As described therein, the sodium salt is obtained by treatment of the free acid with dilute sodium hydroxide.

The dihydrated calcium salt of 2-(3-phenoxyphenyl)propionic acid can be prepared in a manner analogous to that provided in U.S. Pat. No. 3,600,437 for preparation of the sodium salt, that is, by treatment of the free acid with calcium chloride or a similar such compound which will provide a source of the calcium ion. The calcium salt can also be obtained by conversion from the sodium salt. This can be accomplished, for example, by placing the sodium salt in an aqueous medium. The aqueous medium may contain chloroform, for example, up to about 8 percent by weight, or other suitable organic solvents, such as dichloromethane, acetone, methanol, and the like. To the aqueous medium then is added sufficient calcium chloride to react with the sodium salt which thereby exchanges the sodium ion for the calcium ion.

In any event, the dihydrated sodium or calcium salt which is obtained under any of the standard procedures has a relatively low bulk density, that is, one which is less than about 0.6 g. per ml., and one which ranges generally from about 0.25 to 0.45 g. per ml. The low bulk density characteristic generally is accompanied by the aforementioned other properties which render further processing of the salt difficult. The low bulk density salt tends to develop a static charge. Thus, in a typical manufacturing process, the salt tends to adhere to the wall of the vessel, to collect in clumps, or to form a dust, any of which diminishes greatly the flowability and handling of the product. Moreover, the low bulk density prohibits packaging the product in a unit dosage form of reasonable physical size.

The process of this invention avoids these deficiencies by converting the low bulk density dihydrate sodium or calcium salt of 2-(3-phenoxyphenyl)propionic acid to a product of high bulk density, said high bulk density being at least about 0.65 g. per ml., and, preferably, at least about 0.7 g. per ml. Thus, material is obtained which exhibits both desirable density and excellent flow properties. Furthermore, treatment of the salt in accordance with this invention results in very little loss of product since, generally, at least about 99 percent of the original product is recovered. Also to be noted is the fact that conversion from low bulk density to high bulk density material is accomplished conveniently and in a relatively short period of time.

The process of this invention includes, in sequence, the steps of dehydration, rehydration, and recovery.

As already mentioned, the calcium salt starting in a exists in the form of its dihydrate. This represents the presence of about 6.4 percent by weight of water in each molecule of calcium 2-(3-phenoxyphenyl)propionate dihydrate. Sodium 2-(3-phenoxyphenyl)propionate dihydrate, due to an empirical formula differing substantially from that of the calcium salt, contains 12 percent by weight of water. The first essential step to obtaining a product of increased bulk density involves treating the low bulk density dihydrate salt in manner so as to remove water and thereby to break up the dihydrate form. It is not essential in this step to prepare the completely anhydrous form; however, it is essential to reduce the water content at least to a level which represents less water than that represented by a monohydrate salt form. In other words, it is essential to reduce the starting material to a water content of less than 3.2 percent by weight in the case of the calcium salt and less than 6.0 percent in the case of the sodium salt. It is preferred in either case to reduce the water content to about 2.7 percent by weight or less. The first step in the process of this invention therefore is directed to treating the dihydrate salt under conditions which produce the corresponding nearly anhydrous salt or at least a salt containing less than that amount of water representative of the monohydrate form. Preferably, dehydration will be carried out to a water content of 2.7 percent water or less, and, more preferably, the resulting partially dehydrated product will contain about 1.7 percent or less by weight of water. Preferably, the salt of choice for the process of this inventon is calcium 2-(3-phenoxyphenyl)propionate dihydrate.

Dehydration of the dihydrate salt can be accomplished by any recognized technique and/or by employing any equipment well recognized as useful for this purpose. Generally, the water removal will be accomplished by means of a heat system, such as an oven which may or may not be equipped with forced air circulation, a vacuum system, or other like moisture removal aids. The dehydration system can be a shelf dryer, a fluid bed dryer, a rotary dryer, or any other conventional drying system. The dihydrate sodium or calcium salt simply is subjected to conditions which promote dehydration, and these conditions are maintained for a time sufficient to achieve at least the essential extent of water removal.

The salt can be dehydrated by heating it to any temperature short of that at which decomposition occurs. For example, the calcium salt dihydrate begins to decompose at about 210°C., and, thus, any elevated temperature from about 40°C. to about 200°C. can be employed for dehydration purposes. Preferably, the salt will be treated in a dehydration system such as any of those previous mentioned and at a temperature from about 70°C. to about 115°C., and, more preferably, from about 70°C. to about 80°C. Of course, the higher the temperature at which the salt is dehydrated, the more rapid will be its dehydration. Generally, sufficient dehydration can be accomplished by maintaining the salt at a temperature of from about 70°C. to about 80°C. for a period from about 15 minutes to about 10 hours, and, normally, from about 15 minutes to about 3 hours.

Dehydration of the sodium or calcium salt dihydrate can also be accomplished by heating the salt in an organic solvent medium, such as chloroform, acetone, benzene, toluene, or the like, and, preferably, chloroform. For example, the insoluble dihydrate calcium salt is heated in a chloroform medium during which time water is evaporatively removed from the salt and from the mixture. Upon removal of the water, the dehydrated calcium salt dissolves in the chloroform medium, and, upon termination of the dehydration process, the dehydrated calcium salt is recovered by evaporation of the chloroform solvent.

The anhydrous or substantially dehydrated salt which results from the first step of the process is then treated in accordance with the second step of the process of this invention.

The second step of the process of this invention is directed to rehydration of the anhydrous or substantially dehydrated sodium or calcium salt under conditions which have been discovered to produce a high bulk density product, that is, one having a density of at least about 0.65 g./ml., and, generally, from about 0.70 to about 0.75 g./ml. Rehydration of the anhydrous or substantially dehydrated sodium or calcium salt is accomplished by contacting the salt with a water medium. However, an essential factor which governs the ultimate bulk density of the rehydrated product is the temperature of the water which is used in the rehydration step. The dehydrated salt must be subjected to a water medium which is maintained at a temperature of from about 60°C. to about 90°C., and, preferably, one which is maintained at a temperature of from about 70°C. to about 80°C. Treatment of the dehydrated salt with water having a temperature substantially below that of the defined range will produce the dihydrate salt; however, the salt will have a bulk density generally of less than 0.6 g./ml., and, indeed, perhaps even lower than that of the original starting material.

Rehydration can be accomplished simply by bringing the anhydrous or substantially dehydrated sodium or calcium salt into contact with sufficient excess of water, normally by adding the dehydrated salt to water which is maintained at the required temperature or by pouring water maintained at the appropriate temperature onto the dehyrated salt.

Care should be taken to avoid any prolonged delay before rehydrating the dehydrated salt. The dehydrated salt will begin to rehydrate simply by leaving it open to contact with moisture present in the air. Thus, rehydration should be carried out, preferably, immediately upon conclusion of the dehydration, or no later than about 4 hours thereafter. In the event that rehydration cannot be accomplished shortly after completion of the dehydration step, the dehydrated product preferably should be maintained in a closed container so as to avoid any substantial change in the water content of the dehydrated material.

The final step in the process of this invention involves recovery of the product from the water medium employed for rehydration. This is accomplished simply by filtering the product from the cooled aqueous mixture thereof. Prior to filtration, the aqueous mixture generally is cooled to a temperature of about 50°C. or less, and, preferably, to about room temperature or less. Cooling of the mixture facilitates a most nearly complete recovery of the product. The thus obtained product, being suitably treated to remove excess water and having increased bulk density, is then ready for use in whatever manner contemplated.

The following examples are provided to further illustrate the process of this invention.

EXAMPLE 1

Thirty grams of calcium 2-(3-phenoxyphenyl)propionate, dihydrate, having a bulk density of 0.25 g. per ml. were heated in a forced air oven at 75°–80°C. After about two hours the water content of the calcium salt was approximately 4.7 weight percent. Heating was discontinued, and the warm crystals were removed from the oven and were slowly added with vigorous stirring to 250 ml. of water maintained at a temperature of approximately 76°C. The resulting mixture was cooled to 30°C., and the suspension was suctioned filtered. The filtered crystals were dried at 45°C. to obtain a product having a bulk density of approximately 0.46 g. per ml. Due to lack of sufficient extent of dehydration only a marginal bulk density increase over that of the starting material was realized.

EXAMPLE 2

Thirty grams of calcium 2-(3-phenoxyphenyl)propionate, dihydrate, having a bulk density of 0.25 g. per ml. were heated in a forced air oven at 75°–80°C. The water content of the calcium salt was reduced to approximately 2.7 weight percent after which time heating was discontinued. The warm crystals were removed from the oven and were slowly added with vigorous stirring to 250 ml. of water maintained at a temperature of approximately 76°C. The resulting mixture was cooled to 30°C., and the suspension was suctioned filtered. The filtered crystals were dried at 45°C. to obtain a product having a bulk density of approximately 0.70 g. per ml.

EXAMPLE 3

Twenty grams of calcium 2-(3-phenoxyphenyl)propionate, dihydrate, having a bulk density of 0.25 g./ml. were dissolved in 250 ml. of hot chloroform. The mixture was heated, and chloroform was boiled from the mixture with accompanying progressive dehydration of the calcium salt. The residual crystal mass, having a water content of 1.4 percent by weight, was added to 250 ml. of water maintained at a temperature of approximately 75°C. The product was recovered as in Example 1 and had a bulk density of 0.75 g./ml.

The following Table I demonstrates the importance of the extent of dehydration of the dihdyrate calcium salt starting material on the bulk density of the resulting product.

Table I

Effect of Extent of Dehydration on Bulk Density

| Bulk Density of Starting Material, g./ml. | Water in Dehydrated Material, Weight % | Bulk Density, Product[a] g./ml. |
| --- | --- | --- |
| 0.25 | 8.6 | 0.31 |
| 0.25 | 6.3 | 0.32 |
| 0.25 | 4.7 | 0.46 |
| 0.25 | 2.7 | 0.70 |
| 0.25 | 1.4 | 0.75 |

Footnote
[a]Rehydration carried out in water maintained at a temperature of 76 ±2°C.

It is noted that in order to obtain a product having a bulk density of at least 0.65 g. per ml. it is necessary to reduce the water content of the dihydrate starting material to below that equivalent to the monohydrate water content, that is, in the case of the calcium salt, to less than 3.2 percent by weight, and, in the case of the sodium salt, to less than 6.0 percent by weight.

The following Table II illustrates the importance of the temperature of the water employed in rehydrating the previously dehydrated calcium salt.

Table II

Effect of Temperature of Rehydration on Bulk Density

| Bulk Density of Starting Material, g./ml. | Water in Dehydrated Material, Weight % | End Product Rehydration Temp., °C. | End Product Bulk Density g./ml. |
| --- | --- | --- | --- |
| 0.4 | 1.6 | 5 | 0.4 |
| 0.3 | 0.1 – 0.2 | 25 | 0.5 |
| 0.4 | 0.1 – 0.2 | 45 | 0.6 |
| 0.4 | 1.6 | 65 | 0.7 |
| 0.4 | 0.54 | 82 | 0.75 |

It is evident from the data provided in Table II above that the temperature of the water to which the dehydrated calcium salt is added to effect rehydration is crucial to the bulk density of the ultimate product.

I claim:

1. A process for increasing the bulk density of a dihydrate salt compound of the formula

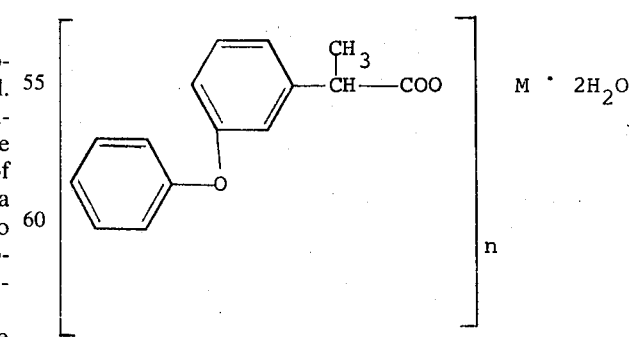

in which M is sodium or calcium, and, when M is sodium, n is 1, and, when M is calcium, n is 2, said compound having a bulk density of less than 0.60 grams per milliliter, which comprises reducing the water content of said compound to less than that represented by a monohydrate form by heating said compound at a temperature form about 40°C to about 200°C., hydrating the compound of reduced water content by contacting said compound with water maintained at a temperature of from about 60°C. to about 90°C., and separating the resulting dihydrate salt compound having a bulk density of at least 0.65 grams per milliliter.

2. Process of claim 1, in which the bulk density of the dihydrate salt starting material is from about 0.25 to about 0.45 grams milliliter.

3. Process of claim 2, in which the dihydrate salt starting material is dehydrated to a water content of about 2.7% by weight or less.

4. Process of claim 3, in which the dehydration is carried out by heating the dihydrate salt at a temperature of from about 70°C. to about 115°C.

5. Process of claim 4, in which rehydration of the compound of reduced water content is carried out by contacting said compound with water maintained at a temperature of from about 70°C. to about 80°C.

6. Process of claim 5, in which the dihdyrate salt compound is the calcium salt.

7. Process of claim 5, in which the dihydrate salt compound is the sodium salt.

* * * * *